(12) United States Patent
Katoh et al.

(10) Patent No.: US 11,384,855 B2
(45) Date of Patent: Jul. 12, 2022

(54) FLUID PRESSURE VALVE

(71) Applicant: NABTESCO CORPORATION, Tokyo (JP)

(72) Inventors: Yuichi Katoh, Gifu-ken (JP); Manabu Sato, Gifu-ken (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/416,461

(22) Filed: May 20, 2019

(65) Prior Publication Data
US 2019/0360603 A1 Nov. 28, 2019

(30) Foreign Application Priority Data

May 22, 2018 (JP) .............................. JP2018-098339

(51) Int. Cl.
*F15B 15/20* (2006.01)
*F16K 15/18* (2006.01)
(Continued)

(52) U.S. Cl.
CPC .......... *F16K 15/1826* (2021.08); *F15B 11/10* (2013.01); *F15B 13/024* (2013.01); *F16K 17/02* (2013.01); *B64C 13/36* (2013.01); *F15B 13/027* (2013.01); *F15B 13/042* (2013.01); *F15B 13/044* (2013.01); *F15B 13/0871* (2013.01);
(Continued)

(58) Field of Classification Search
CPC .......... F15B 13/027; F15B 2211/30505; F15B 2211/55; F15B 2211/7053; F15B 13/044; F15B 13/042; F15B 13/024; F15B 17/02; F15B 11/10; F15B 13/0871; F15B 15/202; F16K 15/186; Y10T 137/87233; Y10T 137/7771; Y10T 137/87177; Y10T 137/7777; Y10T 137/7778; Y10T 137/7779; Y10T 137/87125;
(Continued)

(56) References Cited

U.S. PATENT DOCUMENTS 1,154,396 A * 9/1915 Hayot ..................... B64C 13/00
244/78.1
2,233,649 A * 3/1941 Stahl ..................... F16K 15/063
137/543.13
(Continued)

FOREIGN PATENT DOCUMENTS

CN 104948786 A 9/2015
DE 3221984 A1 12/1983
(Continued)

OTHER PUBLICATIONS

Extended European Search Report EP Application No. 19175089.2 dated Oct. 25, 2019.
(Continued)

*Primary Examiner* — Craig J Price
(74) *Attorney, Agent, or Firm* — Pillsbury Winthrop Shaw Pittman, LLP

(57) ABSTRACT

A fluid pressure valve according to an embodiment of the present invention is applicable to a fluid pressure servo mechanism. The fluid pressure valve includes a housing having a housing member, the housing member being formed integrally so as to have a first port, a second port, and a flow path connecting between the first port and the second port.

2 Claims, 11 Drawing Sheets

(51) Int. Cl.
  *F15B 11/10* (2006.01)
  *F15B 13/02* (2006.01)
  *F16K 17/02* (2006.01)
  *B64C 13/36* (2006.01)
  *F15B 13/042* (2006.01)
  *F15B 13/044* (2006.01)
  *F15B 13/08* (2006.01)

(52) U.S. Cl.
  CPC ... *F15B 15/202* (2013.01); *F15B 2211/30505* (2013.01); *F15B 2211/55* (2013.01); *F15B 2211/7053* (2013.01)

(58) Field of Classification Search
  CPC ............ Y10T 137/87241; B64C 13/36; B64C 13/40–507
  USPC ......... 251/282, 63.4, 86, 63.6; 244/78, 78.1, 244/FOR. 102; 137/493
  See application file for complete search history.

(56) References Cited

U.S. PATENT DOCUMENTS

| | | | | |
|---|---|---|---|---|
| 2,327,171 A * | 8/1943 | Carlson | ............ | G05D 1/044 244/78.1 |
| 2,386,219 A * | 10/1945 | Lauck | ............ | B64C 25/22 137/99 |
| 2,422,296 A * | 6/1947 | Flader | ............ | B64C 13/00 244/211 |
| 2,597,419 A * | 5/1952 | Westbury | ............ | B64C 13/24 91/216 A |
| 3,733,969 A * | 5/1973 | Andrews | ............ | F15B 20/005 91/421 |
| 3,792,715 A * | 2/1974 | Parrett | ............ | F15B 11/04 137/493 |
| 3,942,550 A * | 3/1976 | Orme | ............ | F16K 17/18 137/493 |
| 3,943,968 A * | 3/1976 | Treichler | ............ | B64C 13/38 137/493 |
| 4,088,151 A * | 5/1978 | Schurger | ............ | B66F 9/22 137/596.2 |
| 4,103,699 A * | 8/1978 | Vik | ............ | F15B 13/01 137/106 |
| 4,128,047 A * | 12/1978 | Caero | ............ | B64C 13/44 91/420 |
| 4,192,338 A * | 3/1980 | Gerulis | ............ | F15B 13/01 137/106 |
| 4,361,075 A * | 11/1982 | Block | ............ | F15B 13/01 91/420 |
| 4,389,984 A * | 6/1983 | Destrampe | ............ | F01D 25/18 123/196 S |
| 4,461,449 A * | 7/1984 | Turner | ............ | F15B 13/01 137/493 |
| 4,567,911 A * | 2/1986 | Kedem | ............ | B62B 3/0618 137/454.5 |
| 4,624,445 A * | 11/1986 | Putnam | ............ | F15B 13/01 137/522 |
| 4,630,441 A * | 12/1986 | Chamberlain | ............ | B64C 13/504 60/413 |
| 4,667,570 A * | 5/1987 | Jensen, Jr. | ............ | F15B 13/01 137/495 |
| 4,936,339 A * | 6/1990 | Bennett | ............ | F16K 15/025 137/454.6 |
| 4,967,791 A * | 11/1990 | Sternberger | ............ | F16K 15/18 137/522 |
| 5,062,452 A * | 11/1991 | Johnson | ............ | F04B 53/1027 137/533.25 |
| 5,235,896 A * | 8/1993 | Huber | ............ | F15B 13/01 91/420 |
| 5,343,703 A * | 9/1994 | Kamimura | ............ | B64C 13/40 60/403 |
| 5,358,320 A * | 10/1994 | Fuchida | ............ | B60T 8/5037 303/116.1 |
| 5,400,816 A * | 3/1995 | Gerstenberger | ............ | F15B 13/01 137/106 |
| 5,553,635 A * | 9/1996 | Gregoire | ............ | F16K 39/022 137/1 |
| 5,620,027 A | 4/1997 | Sato | | |
| 5,950,673 A * | 9/1999 | Elliott-Moore | ............ | E21D 15/512 137/596.18 |
| 5,971,353 A * | 10/1999 | Johnson | ............ | E21B 34/06 137/625.66 |
| 6,073,654 A * | 6/2000 | Dettmers | ............ | F15B 13/015 137/630.15 |
| 6,131,610 A * | 10/2000 | Morisako | ............ | F15B 13/01 137/601.19 |
| 6,488,258 B1* | 12/2002 | Dantlgraber | ............ | F15B 13/01 251/325 |
| 6,796,526 B2* | 9/2004 | Boehringer | ............ | F15B 11/036 244/78.1 |
| 6,820,645 B2* | 11/2004 | Behl | ............ | F15B 13/01 137/522 |
| 7,357,152 B2* | 4/2008 | Kussel | ............ | F16K 15/186 137/522 |
| 8,474,479 B2* | 7/2013 | Yoshioka | ............ | F15B 13/024 137/471 |
| 8,561,640 B2* | 10/2013 | McConnell | ............ | F16D 25/12 137/523 |
| 9,487,197 B2* | 11/2016 | Volbel | ............ | B60T 8/342 |
| 9,903,487 B2* | 2/2018 | Bell | ............ | F15B 15/14 |
| 10,059,434 B2* | 8/2018 | Ito | ............ | F16K 31/122 |
| 10,088,066 B2* | 10/2018 | Ito | ............ | F15B 13/024 |
| 10,273,982 B2* | 4/2019 | Tsutsui | ............ | F04C 15/066 |
| 10,760,595 B2* | 9/2020 | Andre | ............ | F15B 13/01 |
| 2004/0112208 A1 | 6/2004 | Kot, II | | |
| 2004/0245386 A1* | 12/2004 | Huynh | ............ | B64C 9/16 244/99.5 |
| 2010/0206405 A1* | 8/2010 | McConnell | ............ | F15B 13/027 137/538 |

FOREIGN PATENT DOCUMENTS

| | | |
|---|---|---|
| GB | 1594268 A | 7/1981 |
| JP | 64-36779 U | 3/1989 |
| JP | 4-56987 U | 5/1992 |
| JP | 6-144385 A | 5/1994 |
| JP | 08-184382 A | 7/1996 |
| JP | 2016-68889 A | 5/2016 |

OTHER PUBLICATIONS

Notice of Reasons for Refusal dated May 31, 2022, issued in corresponding Japanese Patent Application No. 2018-098339 with English translation (11 pgs.).

* cited by examiner

FLUID PRESSURE VALVE

CROSS-REFERENCE TO RELATED APPLICATIONS

This application is based on and claims the benefit of priority from Japanese Patent Application Serial No. 2018-098339 (filed on May 22, 2018), the contents of which are hereby incorporated by reference in their entirety.

TECHNICAL FIELD

The present disclosure relates to a fluid pressure valve. In particular, the present disclosure relates to a fluid pressure valve used in a fluid pressure servo mechanism.

BACKGROUND

A fluid pressure servo mechanism is used to control positions and attitudes of various objects such as flight control surfaces of an airplane. The fluid pressure servo mechanism includes a fluid pressure actuator for driving an object to be controlled and a fluid pressure valve for controlling the flow of a working fluid to the fluid pressure actuator. The fluid pressure actuator has a pair of fluid pressure chambers partitioned by a piston. The fluid pressure actuator is operated by supplying the working fluid to one of the pair of fluid pressure chambers while discharging the working fluid from the other fluid pressure chamber according to the position of the valve element of the fluid pressure valve.

Examples of conventional fluid pressure valves are disclosed in Japanese Patent Application Publication No. Hei 6-144385 and Japanese Patent Application Publication No. 2016-068889. As described in these publications, conventional fluid pressure valves include a hollow housing and a valve element for blocking a flow path between two ports in the housing. The flow path between the two ports is defined by a ring-shaped valve seat support fitted in the housing and a valve seat fitted in the valve seat support. In the valve closing position, the valve element closes the opening of the valve seat to block the communication between the two ports, while in the valve opening position, the valve element separates from the valve seat to communicate between the two ports.

In conventional fluid pressure valves, a flow path between the ports is defined by a valve seat support and a valve seat provided inside the housing. Therefore, the conventional fluid pressure valves suffer from a problem that the radial dimension thereof is larger with the thickness of a member for defining the flow path. In many cases, the member for defining the flow path has a large thickness because it needs to have structural strength to withstand the fluid pressure acting thereon from the working fluid. Further, the conventional fluid pressure valves have seal members for preventing leakage of the working fluid, the seal members provided between the valve seat support and the housing and between the valve seat support and the valve seat. These seal members also cause the increase in the radial dimension of the fluid pressure valve.

As described above, in conventional fluid pressure valves, it is difficult to reduce the radial dimension of the housing because the flow path between the two ports is defined by the valve seat support and the valve seat.

SUMMARY

An object of the present disclosure is to relieve or overcome at least a part of the above problem. In particular, an object of the present disclosure is to provide a fluid pressure valve having a housing with a small radial dimension. Other objects of the disclosure will be apparent with reference to the entire description in this specification.

A fluid pressure valve according to an embodiment of the present invention comprises a housing including a housing member, the housing member being formed integrally so as to have a first port, a second port, and a flow path connecting between the first port and the second port.

In this fluid pressure valve, the flow path connecting between the first port and the second port is defined by the housing formed integrally, and therefore, there is no need of providing a member (e.g., the valve seat support) separate from the housing to define the flow path. In addition, since the flow path connecting between the first port and the second port is defined by the housing formed integrally, there is no need of providing a seal member to prevent leakage of the working fluid. Thus, in the embodiment described above, the housing of the fluid pressure valve can have a small radial dimension.

In the fluid pressure valve according to an embodiment of the present invention, the housing comprises: a first housing part extending in an axial direction of the housing; and a second housing part disposed adjacent to the first housing part in the axial direction and having a smaller outer diameter than the first housing part, and the first housing part includes the first port, the second port, and the flow path.

In this fluid pressure valve, the housing has a small outer diameter at the second housing part that does not include the flow path connecting between the first port and the second port. Thus, the housing can have a small radial dimension at the second housing part.

The fluid pressure valve according to an embodiment of the present invention further comprises a valve element for opening and closing the flow path, In an embodiment of the present invention, the housing includes a valve seat opposed to the valve element in an axial direction of the housing, and the valve element is movable in the axial direction of the housing and configured to contact with the valve seat in a closed position so as to block the flow path.

In this fluid pressure valve, the flow path can be closed without use of a separate valve seat, because the valve element contacts with the valve seat formed in the housing.

In the fluid pressure valve according to an embodiment of the present invention, the valve element has a larger diameter than the valve seat.

In this fluid pressure valve, the flow path between the first port and the second port can be closed without use of a separate valve seat, because the valve element contacts with the valve seat formed in the housing.

In the fluid pressure valve according to an embodiment of the present invention, the housing includes a projection for directing a flow of a working fluid In this fluid pressure valve, the flow of the working fluid can be directed with the projection provided on the valve seat. Thus, the flow of the working fluid can be optimized.

In the fluid pressure valve according to an embodiment of the present invention, the valve element includes a projection for directing a flow of a working fluid, the projection being disposed on an end surface of the valve element opposed to the valve seat.

In this fluid pressure valve, the flow of the working fluid can be directed with the projection provided on the valve element. Thus, the flow of the working fluid can be optimized.

In the fluid pressure valve according to an embodiment of the present invention, the flow path includes a circling flow path extending in a circumferential direction of the housing, and a section of the circling flow path has a smaller dimension in a radial direction of the housing than in the axial direction of the same.

In this fluid pressure valve, the circling flow path of the flow path can have a smaller dimension in the radial direction of the housing. Thus, the housing can have a smaller radial dimension.

In the fluid pressure valve according to an embodiment of the present invention, the circling flow path is connected with the first port, and a sectional area of the circling flow path at a first position distal from the first port is larger than that at a second position more proximal to the first port than the first position.

In this fluid pressure valve, the working fluid flowing in via the first port can be easily guided to a position distal from the first port. Therefore, when the valve element is opened, the flow of the working fluid flowing in via the first port can be uniformed.

In the fluid pressure valve according to an embodiment of the present invention, the housing is configured such that a sectional shape of the circling flow path is at least partially formed of a curved line.

In this fluid pressure valve, when the valve is opened, the working fluid passes along the curved surface and flows out of the circling flow path. Therefore, the pressure loss of the working fluid can be reduced. As a result, the housing can have a small size.

A fluid pressure servo mechanism according to an embodiment of the present invention comprises: a fluid pressure actuator having a pair of fluid pressure chambers; and a fluid pressure valve having a housing and communicating with at least one of the pair of fluid pressure chambers via a connecting flow path. In this fluid pressure servo mechanism, at least part of the connecting flow path extends along an outer surface of the housing.

In this fluid pressure servo mechanism, it is possible to reduce the length of the connecting flow path that connects between the fluid pressure actuator and the fluid pressure valve. For example, a port formed in the fluid pressure actuator and a port formed in the fluid pressure valve can be arranged adjacent to each other so as to reduce the length of the connecting flow path connecting between the ports.

ADVANTAGES

According to the embodiments of the present invention, the fluid pressure valve can have a housing with a small radial dimension.

BRIEF DESCRIPTION OF THE DRAWINGS

In FIG. 5, the flow path between the ports is opened.

In FIG. 7, the flow path between the ports is closed by a valve element.

In FIG. 8, the flow path between the ports is opened by the valve element.

DESCRIPTION OF THE EMBODIMENTS

Various embodiments of the invention will be described hereinafter with reference to the accompanying drawings. In the figures, elements common to different views are denoted by the same reference signs. It should be noted that the drawings do not necessarily appear to an accurate scale, for convenience of description.

Figure 1:
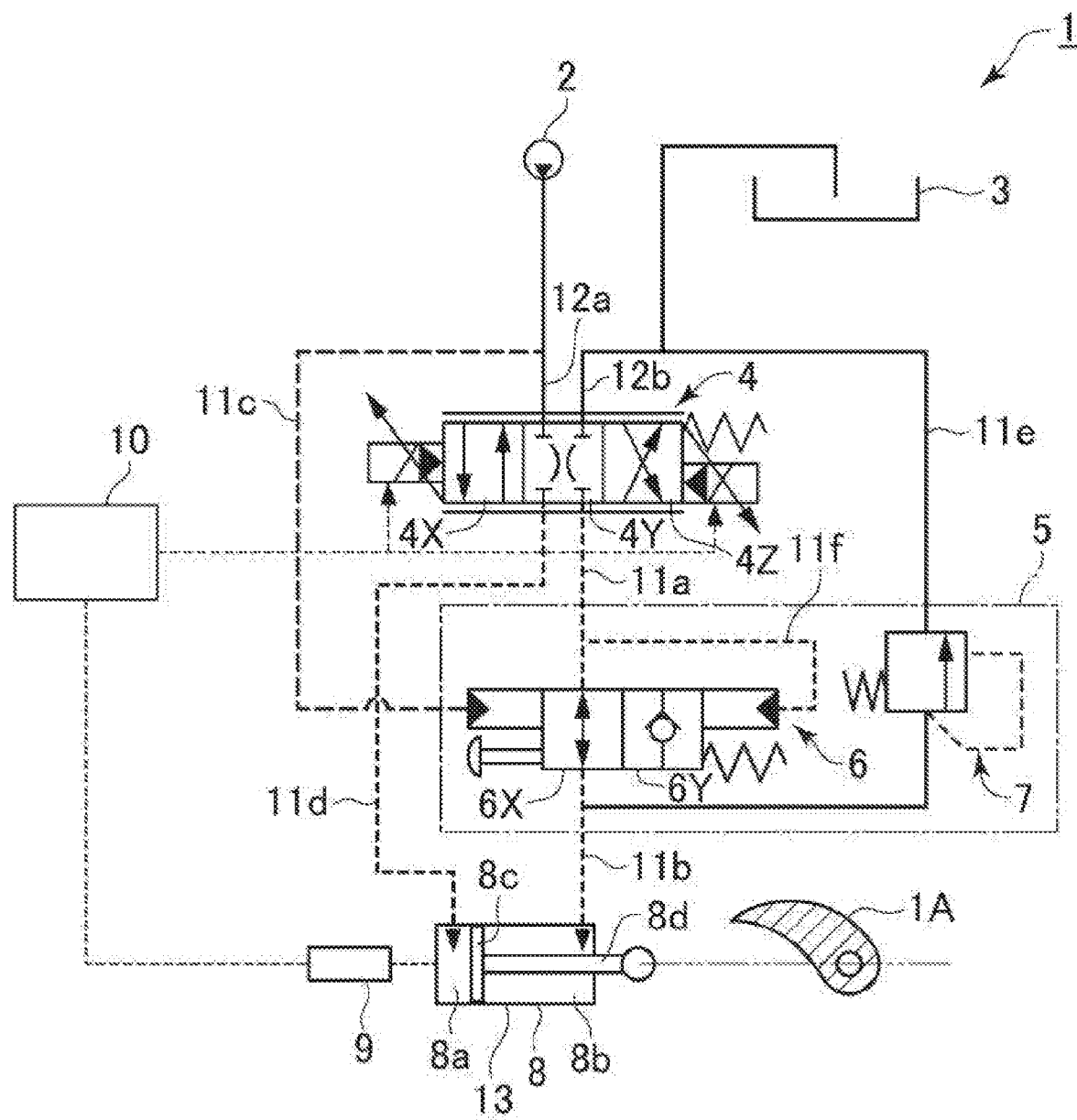
FIG. 1 schematically shows a servo mechanism including a fluid pressure valve according to an embodiment of the present invention.

The present invention may be applied to a fluid pressure valve having at least two ports. With reference to FIG. 1, a description is given of a servo mechanism including a fluid pressure valve according to an embodiment of the present invention.

FIG. 1 shows a fluid pressure servo mechanism 1 including a fluid pressure valve 5 according to an embodiment of the present invention. The fluid pressure servo mechanism 1 serves as a flight control surface driving mechanism for driving a flight control surface 1A of an airplane by operating an actuator 8. The fluid pressure servo mechanism 1 is an example of a servo mechanism including a fluid pressure valve according to the present invention. The fluid pressure valve according to the present invention may also be used in various servo mechanisms other than the flight control surface driving mechanism.

The fluid pressure servo mechanism 1 includes the actuator 8 for driving the flight control surface 1A, a fluid pressure source 2 for supplying a working fluid to the actuator 8, a reservoir 3 for storing the working fluid discharged from the actuator 8, a control valve 4, and the fluid pressure valve 5.

Examples of the flight control surface 1A include primary control surfaces such as an aileron, a rudder, and an elevator and secondary control surfaces such as a flap and a spoiler.

In the embodiment shown, the actuator 8 may be a hydraulic actuator operated with a pressure oil. In addition, the actuator 8 may also be a hydraulic actuator operated with a working liquid other than a pressure oil, a pneumatic actuator operated with a compressed air, and any hydropneumatic actuator operated with other working fluids. It is also possible that the fluid pressure servo mechanism 1 includes a plurality of actuators.

The actuator 8 is partitioned into a first fluid pressure chamber 8a and a second fluid pressure chamber 8b by a piston 8c provided in a hollow cylinder 13. The cylinder 13 of the actuator 8 is open at one end in the longitudinal direction and is closed at the other. The piston 8c is connected with a piston rod 8d. The piston rod 8d is partially projected out of the cylinder 13.

The control valve 4 may be a solenoid valve. The control valve 4 is disposed between the actuator 8, and the fluid pressure source 2 and the reservoir 3 and controls supply of the working fluid from the fluid pressure source 2 to the first fluid pressure chamber 8a and the second fluid pressure chamber 8b and discharge of the working fluid from the first fluid pressure chamber 8a and the second fluid pressure chamber 8b to the reservoir 3. The control valve 4 is connected to the fluid pressure source 2 via a flow path 12a, to the reservoir 3 via a flow path 12b, and to the first fluid pressure chamber 8a of the actuator 8 via a flow path 11d. The control valve 4 includes an electromagnetic coil and a movable core and is configured to excite the electromagnetic coil based on a control signal input from a controller 10 and displace the movable core by the magnetic flux generated from the excited electromagnetic coil, thereby to switch the flow path of pressure oil communicating with the fluid pressure chambers 8a, 8b. More specifically, the control valve 4 can switch between a first communication position 4X, a second communication position 4Y, and a blocking position 4Z. In the first communication position 4X, the control valve 4 supplies the oil to the first fluid pressure chamber 8a and discharges the oil from the second fluid pressure chamber 8b; in the second communication position 4Y, the control valve 4 discharges the oil from the first fluid pressure chamber 8a and supplies the oil to the second fluid pressure chamber 8b; and in the blocking position 4Z, the control valve 4 blocks the supply of the oil to the fluid pressure chambers 8a, 8b and the discharge of the oil from the fluid pressure chambers 8a, 8b.

The fluid pressure valve 5 is connected to the control valve 4 via a flow path 11a, to the second fluid pressure chamber 8b of the actuator 8 via a flow path 11b, and to the reservoir 3 via a flow path 11e. The fluid pressure valve 5 includes a check valve 6 and a relief valve 7. The check valve 6 can switch between a communication position 6X and a blocking position 6Y. In the communication position 6X, the check valve 6 communicates between the second fluid pressure chamber 8b and the control valve 4; and in the blocking position 6Y, the check valve 6 blocks the communication between the second fluid pressure chamber 8b and the control valve 4. When the fluid pressure (pilot pressure) is supplied from the fluid pressure source 2 via the flow path 11c, the check valve 6 is set to the communication position 6X. The relief valve 7 is configured to discharge the working fluid to the reservoir 3 when the fluid pressure in the second fluid pressure chamber 8b of the actuator 8 is equal to or higher than a prescribed value. The check valve 6 is provided with an auxiliary flow path 11f for taking out the pilot pressure from a closed flow path formed in the check valve 6 when set at the blocking position 6Y.

The actuator 8 may include a position sensor 9 for sensing the position of the piston 8c. The position sensor 9 may be a linear variable differential transformer (LVDT).

The controller 10 includes a processor for performing various arithmetic operations, a memory for storing various programs and various data, and a device interface connected to the position sensor 9 and other devices. The controller 10 outputs control pulses to the control valve 4 to switch the control valve 4. The controller 10 identifies the position of the piston 8c based on the sensing signal from the position sensor 9 and performs feedback control based on the identified position of the piston 8c so as to set the flight control surface 1A to a target position in accordance with the flight conditions of the airplane.

A description is given of the operation of the fluid pressure servo mechanism 1. The fluid pressure from the fluid pressure source 2 is supplied to the fluid pressure valve 5 as the pilot pressure, and thus the fluid pressure valve 5 takes the communication position 6X.

When the control valve 4 is set to the first communication position 4X based on the control signal from the controller 10, the working fluid in the fluid pressure source 2 is supplied to the first fluid pressure chamber 8a via the control valve 4, and the working fluid in the second fluid pressure chamber 8b is discharged to the reservoir 3 via the fluid pressure valve 5 and the control valve 4. This operation causes expansion of the first fluid pressure chamber 8a and contraction of the second fluid pressure chamber 8b, and therefore, the flight control surface 1A moves upward When the control valve 4 is set to the second communication position 4Y based on the control signal from the controller 10, the oil in the fluid pressure source 2 is supplied to the second fluid pressure chamber 8b via the control valve 4 and the fluid pressure valve 5, and the oil in the first fluid pressure chamber 8a is discharged to the reservoir 3 via the control valve 4. This operation causes expansion of the second fluid pressure chamber 8b and contraction of the first fluid pressure chamber 8a, and therefore, the flight control surface 1A moves downward.

Figure 2:
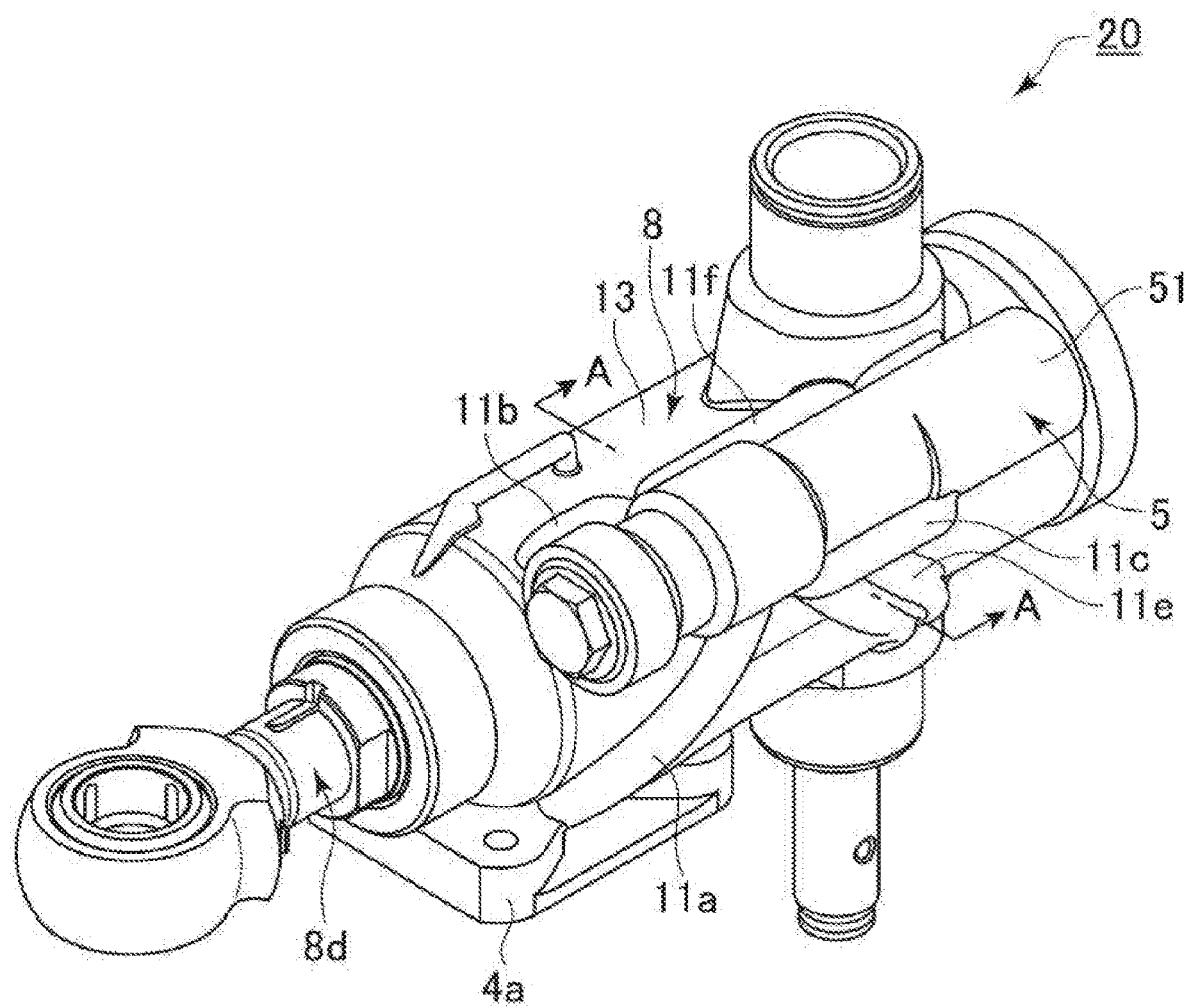
FIG. 2 is a perspective view schematically showing a manifold provided with the fluid pressure valve according to the embodiment of the present invention.

Next, with reference to FIG. 2, a description is given of a manifold including the fluid pressure valve 5 and the actuator 8. FIG. 2 is a perspective view schematically showing a manifold 20 including the fluid pressure valve 5 and the actuator 8. The manifold 20 also includes various fluid pressure devices other than the fluid pressure valve 5 and the actuator 8.

As shown, the manifold 20 includes a housing 51 that forms a shell of the fluid pressure valve 5, the cylinder 13 of the actuator 8, a joint 4a to which the control valve 4 is connected, and the flow paths 11a to 11f, 12a, 12b. The flow paths 11d, 12a, 12b, provided behind the cylinder 13, are not shown in FIG. 2. The control valve 4 is mounted, or bolted for example, to the manifold 20 via the joint 4a. In addition to the control valve 4, various members may be mounted to the manifold 20 so as to cooperate with the actuator 8 and/or the fluid pressure valve 5.

The manifold 20 may be configured such that the entirety, the main part, or a part thereof is integrated. For example, the housing 51 of the fluid pressure valve 5 may be integrated with the cylinder 13 of the actuator 8.

A part or the entirety of each of the flow paths 11a to 11f, 12a, 12b may extend along the outer surface of the cylinder 13 of the actuator 8. In the embodiment shown, the flow path 11a extends from the joint 4a to the housing 51 of the fluid pressure valve 5 along the outer surface of the cylinder 13, and the flow path 11b extends along the cylinder 13 from a port (not shown) formed in the cylinder 13 and communicating with the second fluid pressure chamber 8b, to the fluid pressure valve 5.

In an embodiment of the present invention, the manifold 20 is formed of various metal materials or various resin materials by additive manufacturing. Metal materials for the manifold 20 include titanium, aluminum, nickel, cobalt, chromium, stainless steels, and other metal materials suitable for additive manufacturing. Resin materials for the manifold 20 include polyether ether ketone (PEEK), polyether ketone ketone (PEKK), polyether ketone ether ketone ketone (PEKEKK), polyether imide (PEI), polyphenylene sulfide (PPS), polysulfone (PSU), polyamide (PA), polyphthalamide (PPA), and other resin materials suitable for additive manufacturing.

Additive manufacturing methods applicable to the present invention include direct metal laser melting (DMLM), direct metal laser sintering (DMLS), selective laser sintering (SLS), selective laser melting (SLM), electron beam melting (EBM), fusion deposition modeling (FDM), stereolithography, hot melt lamination, powder fixation, and other additive manufacturing methods known to those skilled in the art, or processes including these methods combined together.

The above description of the manifold 20 is for illustration purpose, and the modes described explicitly in this specification do not limit the shape, production, method, arrangement, and other features of the manifold 20. For example, in the embodiment shown, the actuator 8 and the fluid pressure valve 5 are arranged so as to be longitudinally in parallel to each other. It is also possible that the actuator 8 and the fluid pressure valve 5 are not longitudinally in parallel to each other.

Installation of the components of the fluid pressure servo mechanism 1 to the manifold 20 makes it possible to reduce the length of the flow path 11b that connects between the fluid pressure actuator 8 and the fluid pressure valve 5. For example, a port (not shown) formed in the fluid pressure actuator 8 and a port (a first port 61a described later) formed in the fluid pressure valve 5can be arranged adjacent to each other so as to reduce the length of the flow path 11b.

Figure 3:
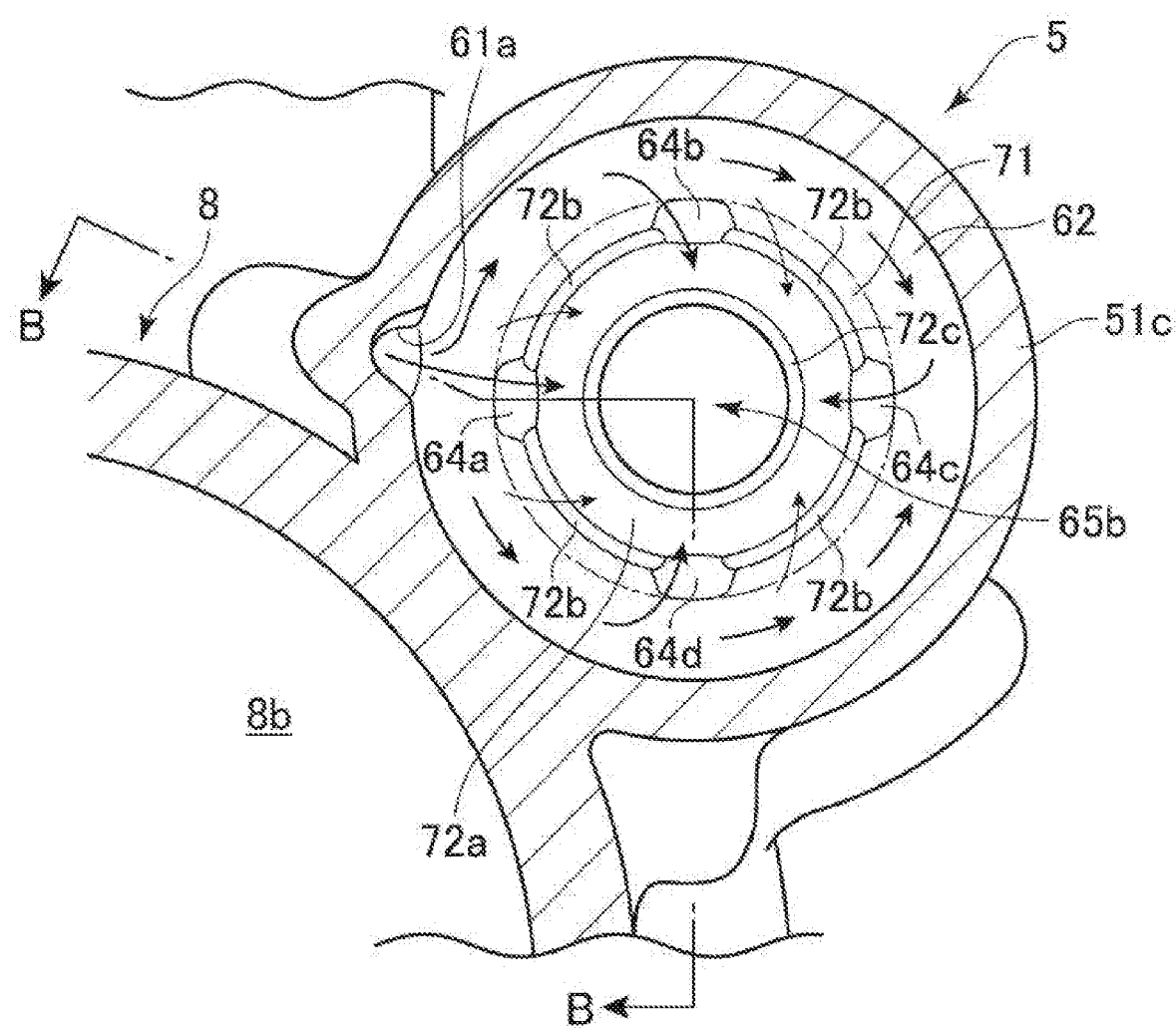
FIG. 3 is a sectional view schematically showing a section of the fluid pressure valve according to the embodiment of the present invention cut along the line A-A in FIG. 2.
Figure 4:
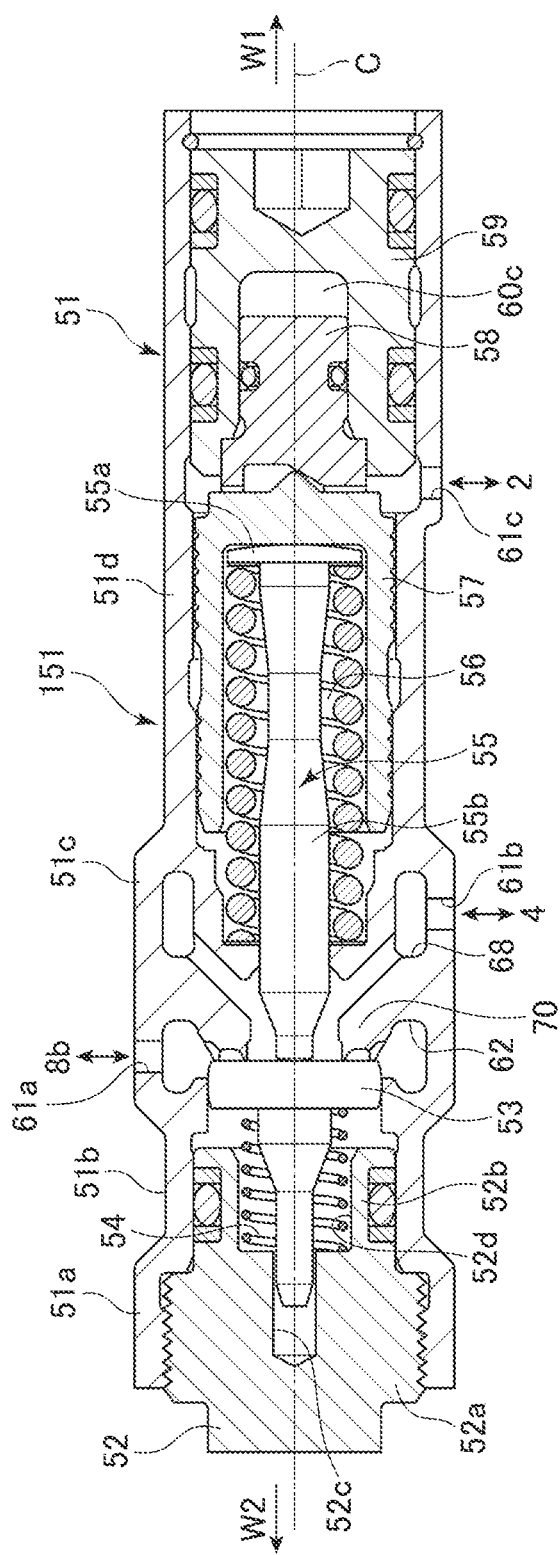
FIG. 4 is a sectional view schematically showing a section of the fluid pressure valve according to the embodiment of the present invention cut along the line B-B in FIG. 3.

Next, with reference to FIGS. 3 and 4, a further description is given of the fluid pressure valve 5 according to the embodiment of the present invention. FIG. 3 is a sectional view schematically showing a section of the fluid pressure valve 5 of FIG. 2 cut along the line A-A, and FIG. 4 is a sectional view schematically showing a section of the fluid pressure valve 5 cut along the line B-B in FIG. 3.

As shown in these drawings, the fluid pressure valve 5 is provided with the housing 51 that serves as a casing. The housing 51 has a cylindrical shape that extends along the central axis C. The housing 51 includes an inner space that extends through the housing 51 along the central axis C.

In this specification, the direction along the central axis C may be referred to as the longitudinal direction of the housing 51, and the directions orthogonally intersecting the central axis C may be referred to as the radial directions of the housing 51.

The housing 51 includes includes a housing member 151. The housing member 151 includes a housing member 51a, a housing member 51b, a housing member 51c, and a housing member 51d, and these housing members are arranged in the direction from the end in the second direction W2 to the end in the first direction W1 along the central axis C. The housing members each extend in the direction of the central axis C. The housing member 51c has a larger outer diameter than the housing member 51b and the housing member 51d adjacent to the housing member 51c. In one embodiment, the housing member 51c may be referred to as first housing part and the housing member 51d may be referred to as second housing part.

The entirety of the housing 51 may be formed integrally, or a part of the components of the housing 51 may be formed integrally. The housing 51 may be formed of a plurality of unit members formed separately and joined together by bolt fastening, welding, or other joining methods. In the embodiment of the present invention, the entirety of the housing member 51c included in the housing 51 is formed integrally. When it is described herein that a housing or a housing member is "formed integrally" the housing or the housing member is a unitary member, not a composite member that can be divided into a plurality of parts. There is no junction surface between a plurality of parts in the housing or the housing member formed integrally. Accordingly, when the entirety of the housing 51 is formed integrally, the housing 51 is a unitary member, and when the entirety of the housing member 51c is formed integrally, the housing member 51c is a unitary member. The housing 51 may be produced by integrally forming each of the housing member 51a, the housing member 51b, the housing member 51c, and the housing member 51d and joining these four integrally formed housing members to adjacent ones.

The housing 51 has a plurality of ports formed therein that communicate between the inner space and the outside thereof. In the embodiment shown, there are formed a first port 61a that communicates with the second fluid pressure chamber 8b, a second port 61b that communicates with the control valve 4, and a third port 61c that communicates with the fluid pressure source 2. In addition to the ports shown, the housing 51 has a discharge port that communicates with the reservoir 3 and an auxiliary oil passage port that communicates with an auxiliary oil passage 11f, and these ports are omitted in FIG. 4. The discharge port that communicates with the reservoir 3 is disposed, for example, between the second port 61b and the third port 61c. The auxiliary oil passage port that communicates with the auxiliary oil passage 11f is formed, for example, on the first direction W1 side of the third port 61c.

The housing 51 contains, in the inner space thereof, a cap 52, a valve element 53, a rod 55, a slider 57, a plunger 58, a plug 59, and other components of the fluid pressure valve 5.

The cap 52 is mounted on an end of the housing 51 on the second direction W2 side. The cap 52 blocks an opening in the end of the housing 51 on the second direction W2 side. In the embodiment shown, the cap 52 includes a cap base 52a, and a cap sleeve 52b that extends from the cap base 52a in the first direction W1 and has a cylindrical shape. The cap base 52a has an external thread formed in the outer peripheral surface thereof. The external thread is threadedly engaged with an internal thread formed in an inner peripheral surface of the housing member 51a, and the cap sleeve 52b is fitted on the inner side of the housing member 51b, such that the cap 52 is mounted on the housing 51. The cap base 52a has a first recess 52c formed therein in the direction of the central axis C, and the cap sleeve 52b has a second recess 52d having a larger diameter than the first recess 52c.

The valve element 53 includes a valve element head 53a and a valve element base 53b extending from the valve element head 53a in the second direction W2. The valve element 53 is disposed such that a distal end of the valve element base 53b is received in the first recess 52c and the second recess 52d of the cap 52. The valve element head 53a has a cylindrical shape and is fitted on the inner side of the housing member 51c. In the embodiment shown, an end surface 53c of the valve element head 53a facing toward the first direction W1 is a flat plane perpendicular to the central axis C. The valve element 53 is slidable along the central axis C.

The valve element 53 is configured and arranged so as to block a flow path between the first port 61a and the second port 61b when the valve element 53 is in a closed position along the central axis C. FIG. 4 shows the valve element 53 in the closed position.

The cap sleeve 52b of the cap 52 is provided with a press spring 54. The press spring 54 is disposed between a bottom surface of the second recess 52d of the cap 52 and the valve element head 53a and configured to bias the valve element head 53a in the first direction W1.

The slider 57 is disposed in the housing 51 between the second port 61b and the third port 61c so as to be slidable with respect to the housing 51 in the direction of the central axis C. The slider 57 has a cup-like shape that is open toward the cap 52 (the second direction W2). The rod 55 is provided in the slider 57. The rod 55 includes a rod base 55a having a disk-like shape and a rod body 55b extending from the rod base 55a toward the cap 52 (the second direction W2). The rod 55 is mounted on the slider 57 via the rod base 55a. The distal end (the end on the second direction W2 side) of the rod body 55b is in contact with the valve element 53. Between the rod base 55a and an inner wall of the housing 51, there is provided a press spring 56. The press spring 56 biases the rod base 55a toward the plug 59 (the first direction W1). The slider 57 is movable along the central axis C toward the second direction W2 by a pilot pressure supplied via the third port 61c. As the slider 57 moves in the second direction W2, the rod 55 also moves in the second direction W2. This causes the rod body 55b to press the valve element 53 in the second direction W2, and thus the valve element 53 also moves in the second direction W2. As a result, the flow path between the first port 61a and the second port 61b is opened. In this way, the pilot pressure supplied to the fluid pressure cylinder 5 opens the flow path between the first port 61a and the second port 61b.

The plug 59 is mounted on an end of the housing 51 on the first direction W1 side and blocks an opening in an end of the housing 51 on the first direction W1 side.

The plug 59 has a recess that is open toward the slider 57 (the second direction W2), and the plunger 58 is disposed in this recess. Between the plunger 58 and the recess of the plug 59, there is formed an inner space 60c. The plug 59 has a cutout formed therein (not shown), and the inner space 60c communicates with the auxiliary oil passage 11f via the cutout and a port (not shown). The plunger 58 is disposed such that an end surface thereof on the second direction W2 side contacts with the slider 57.

As shown, the housing member 51c of the housing 51 has a first circling flow path 62 and a second circling flow path 68 formed therein. The first circling flow path 62 extends circumferentially around the central axis C, and the second circling flow path 68 is disposed at a distance from the first circling flow path 62 toward the first direction W1 along the central axis C. The first circling flow path 62 is connected with the first port 61a. The second circling flow path 68 is connected with the second port 61b.

Figure 5:
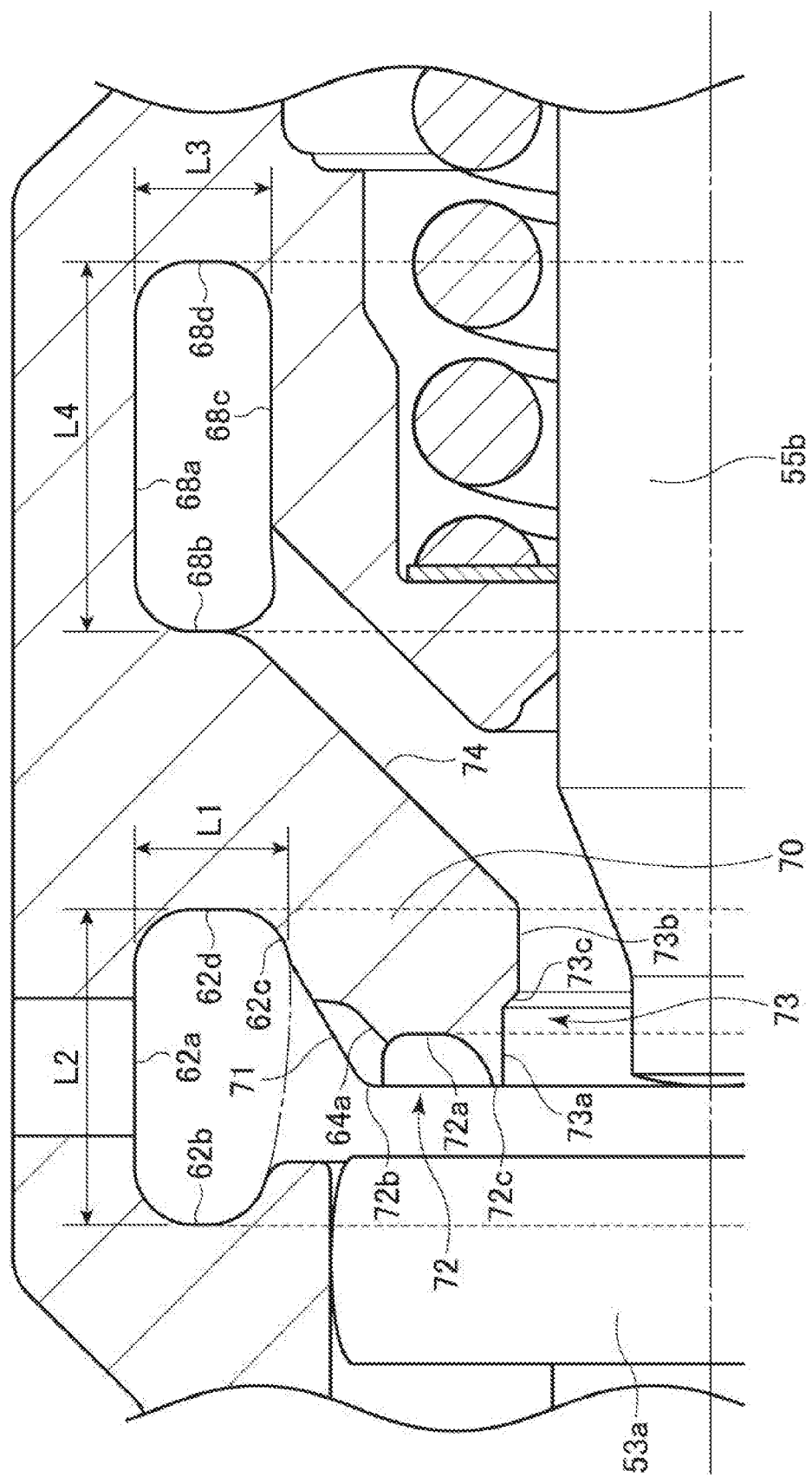
FIG. 5 is an enlarged sectional view of the fluid pressure valve of FIG. 3 for describing a flow path between ports.

Next, with additional reference to FIG. 5, a further description will be given of a flow path that connects between the first port 61a and the second port 61b in the housing 51. FIG. 5 is an enlarged sectional view showing a part of the housing member 51c of the fluid pressure valve 5 in an enlarged scale.

As shown, the first circling flow path 62 has a substantially rectangular section. The first circling flow path 62 is defined by a first wall 62a, a second wall 62b, a third wall 62c, and a fourth wall 62d. In one embodiment, the first wall 62a, the second wall 62b, the third wall 62c, and the fourth wall 62d of the first circling flow path 62 may be referred to as sectional shape of the first circling flow path 62. The first wall 62a extends in the direction of the central axis C and has a communication hole connected with the first port 61a; the second wall 62b extends from the first wall 62a in a substantially radial direction; the third wall 62c is disposed radially inside the first wall 62a so as to be opposed to the first wall 62a; and the fourth wall 62d is disposed on the first direction W1 side of the second wall 62b in the direction of the central axis C so as to be opposed to the second wall 62b. The third wall 62c has a cutout formed therein to allow the working fluid to flow radially inward. In the embodiment of the present invention, the first circling flow path 62 is formed such that the dimension L1 of the section thereof in the radial direction (the distance L1 between the first wall 62a and the third wall 62c) is smaller than the dimension L2 of the same in the direction of the central axis C (the distance L2 between the second wall 62b and the fourth wall 62d).

As with the first circling flow path 62, the second circling flow path 68 is formed such that the section thereof has a substantially rectangular shape. The second circling flow path 68 is defined by a first wall 68a, a second wall 68b, a third wall 68c, and a fourth wall 68d. The first wall 68a extends in the direction of the central axis C and has a communication hole connected with the second port 61b; the second wall 68b extends from the first wall 68a in a substantially radial direction; the third wall 68c is disposed radially inside the first wall 68a so as to be opposed to the first wall 68a; and the fourth wall 68d is disposed on the first direction W1 side of the second wall 68b in the direction of the central axis C so as to be opposed to the second wall 68b. The third wall 68c has a cutout formed therein to allow the working fluid to flow radially inward. In the embodiment of the present invention, the second circling flow path 68 is formed such that the dimension L3 of the section thereof in the radial direction (the distance L3 between the first wall 68a and the third wall 68c) is smaller than the dimension L4 of the same in the direction of the central axis C (the distance L4 between the second wall 68b and the fourth wall 68d).

The first wall 62a, the second wall 62b, the third wall 62c, and the fourth wall 62d of the first circling flow path 62 may curve in the axial direction along the central axis C. The first wall 62a either extends in parallel with the central axis C or curve with a larger radius of curvature in the axial direction along the central axis C than the third wall 62c. Likewise, the first wall 68a, the second wall 68b, the third wall 68c, and the fourth wall 68d of the second circling flow path 68 may curve in the axial direction along the central axis C. The first wall 68a either extends in parallel with the central axis C or curve with a larger radius of curvature in the axial direction along the central axis C than the third wall 68c.

Between the first circling flow path 62 and the second circling flow path 68, there is disposed a mount 70 constituting a part of the housing member 51c. The mount 70 is formed integrally with the housing member 51c. A part of the mount 70 is positioned between the first circling flow path 62 and the second circling flow path 68. The mount 70 projects radially inward from the outer side of the housing 51. In the embodiment shown, the mount 70 extends from the region between the first circling flow path 62 and the second circling flow path 68 to the region radially inside the first circling flow path 62. The mount 70 includes a slope surface 71 adjacent to the third wall 62c of the first circling flow path 62, a seat surface 72 adjacent to the first slope surface 71, a cylindrical surface 73 adjacent to the seat surface 72, and a plurality of tubular surfaces 74 extending from the cylindrical surface 73 to the second circling flow path 68. Each of the slope surface 71, the seat surface 72, the cylindrical surface 73, and the plurality of tubular surfaces 74 constitutes a part of the housing member 51c.

The slope surface 71 extends in the circumferential direction around the central axis C and in the direction oblique to the central axis C radially inward from the third wall 62c of the first circling flow path 62. The slope surface 71 may be curved toward the central axis C. The slope surface 71 and the third wall 62c of the first circling flow path 62 may be connected with each other via a curved surface The seat surface 72 extends generally radially inward from the radially inner end of the slope surface 71. The seat surface 72 has an opening formed near the central axis C.

The seat surface 72 is opposed to the end surface 53c of the valve element 53. The seat surface 72 has a recess 72a formed toward the first direction W1 along the central axis C. The recess 72a extends circumferentially around the central axis C, with an outer valve seat 72b provided on the radially outer side of the recess 72a and an inner valve seat 72c provided on radially inner side of the recess 72a. The inner valve seat 72c has a ring-like shape that extends circumferentially around the central axis C. The inner circumferential surface of the inner valve seat 72c defines the opening in the seat surface 72. In this way, the seat surface 72 includes the outer valve seat 72b, the recess 72a, and the inner valve seat 72c arranged in the order from the radially outer side to the radially inner side. The valve element 53 blocks the flow path between the first port 61a and the second port 61b when the end surface 53c of the valve element head 53a contacts with the inner valve seat 72c. To establish the blocking of the flow path, the valve element 53 is formed such that the valve element head 53a has a larger diameter than the inner valve seat 72c.

The slope surface 71 has four recesses 64a, 64b, 64c, 64d formed toward the first direction W1. These recesses 64a, 64b, 64c, 64d are arranged circumferentially around the central axis C at substantially regular intervals. Each of the recesses 64a, 64b, 64c, 64d extends radially from the slope surface 71 to the outer edge of the seat surface 72. Therefore, each of the recesses 64a, 64b, 64c, 64d is connected with the recess 72a. As shown in FIG. 3, these recesses 64a, 64b, 64c, 64d divide the outer valve seat 72b into four parts. Each of the four parts of the outer valve seat 72b extends by less than 90° in the circumferential direction around the central axis C.

The cylindrical surface 73 has a substantially cylindrical shape that extends along the central axis C from the radially inner end of the seat surface 72. The cylindrical surface 73 includes a first cylindrical surface 73a having a large diameter, a second cylindrical surface 73b having a smaller diameter than the first cylindrical surface 73a, and a slant surface 73c connecting between the first cylindrical surface 73a and the second cylindrical surface 73b.

The plurality of tubular surfaces 74 each have a tubular shape that extends in the direction oblique to the central axis C radially outward from the end of the cylindrical surface 73 on the first direction W1 side. The plurality of tubular surfaces may include a desired number of tubular surfaces.

Figure 6:
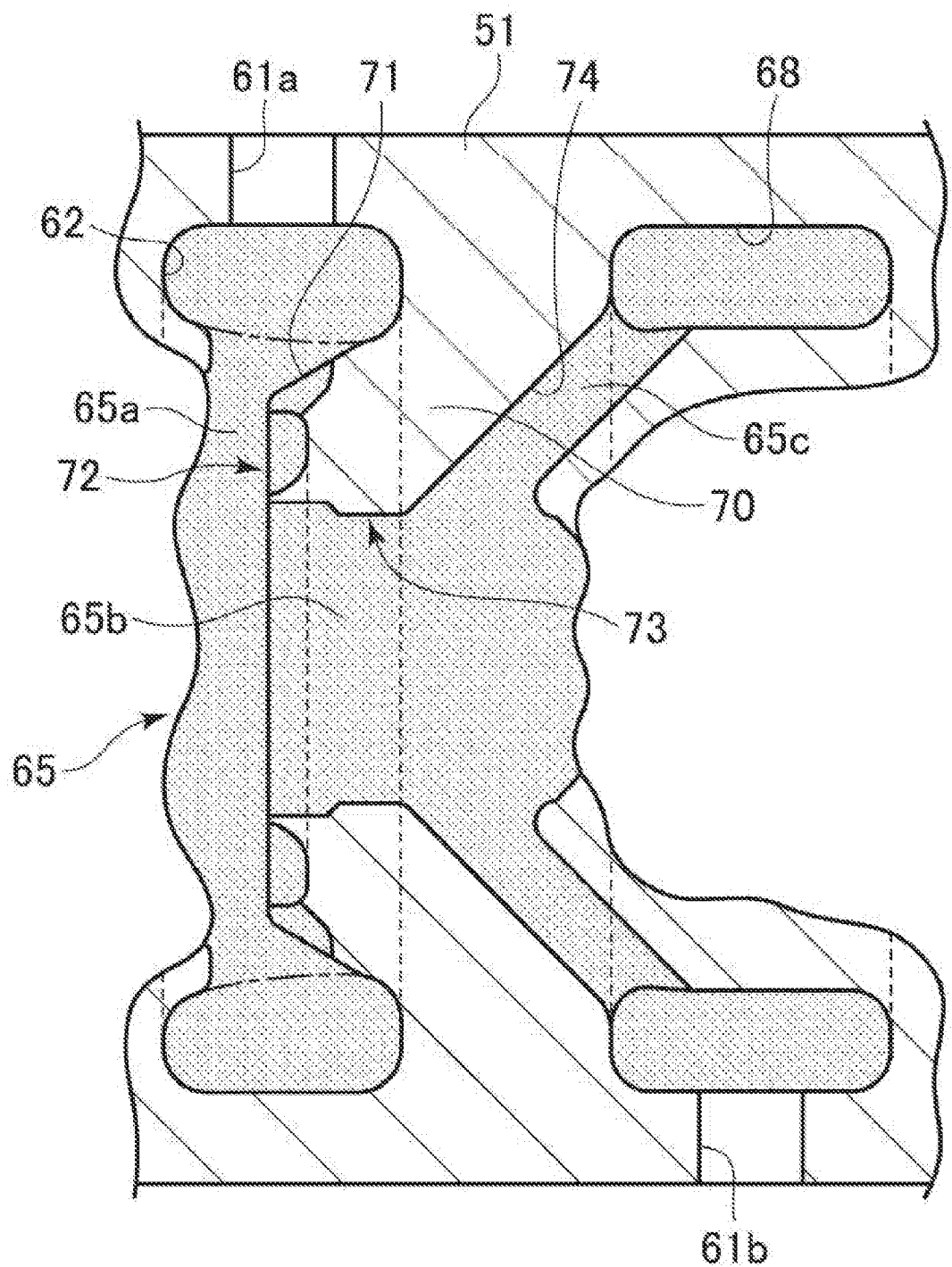
FIG. 6 is a sectional view schematically showing a part of a housing of the fluid pressure valve.

With additional reference to FIG. 6, a description will be given of the flow path 65 that connects between the first port 61a and the second port 61b. FIG. 6 is a sectional view of the housing member 51c cut along the B-B line in FIG. 3. For clear representation of the flow path, FIG. 6 omits the valve element 53, the rod body 55b, and the press spring 56.

As shown, the flow path 65 for the working fluid connecting between the first port 61a and the second port 61b includes the first circling flow path 62, a first flow path 65a, a second flow path 65b, a third flow path 65c, and the second circling flow path 68. As described above, the first circling flow path 62 and the second circling flow path 68 extend circumferentially around the central axis C. The first circling flow path 62 communicates with the first port 61a, and the second circling flow path 68 communicates with the second port 61b. The first flow path 65a extends radially inward from the first circling flow path 62. At least a part of the first flow path 65a is defined by the slope surface 71 and the seat surface 72. The second flow path 65b is defined by the cylindrical surface 73. The second flow path 65b extends from the first flow path 65a in the first direction W1 along the central axis C. The third flow path 65c is defined by the tubular surfaces 74. The third flow path 65c connects between the second flow path 65b and the second circling flow path 68. The flow path 65 contains the valve element 53 and the rod body 55b.

In this way, the flow path 65 connecting between the first port 61a and the second port 61b is defined by the housing 51 (the housing 51c in the embodiment shown). Therefore, in the fluid pressure valve 5, there is no need of providing, in the inner space of the housing 51, a member separate from the housing 51 (for example, the valve seat support or the valve seat separate from the housing in the conventional art) to define the flow path 65 connecting between the first port 61a and the second port 61b. The flow path 65 contains the valve element 53 for opening and closing the flow path 65 and the rod body 55b for pressing the valve element 53, and these members serve to open and close the flow path 65, not to define the flow path 65. Therefore, the flow path 65 connecting between the first port 61a and the second port 61b is defined only by the housing 51 except for the members for opening and closing the flow path 65.

Figure 7:
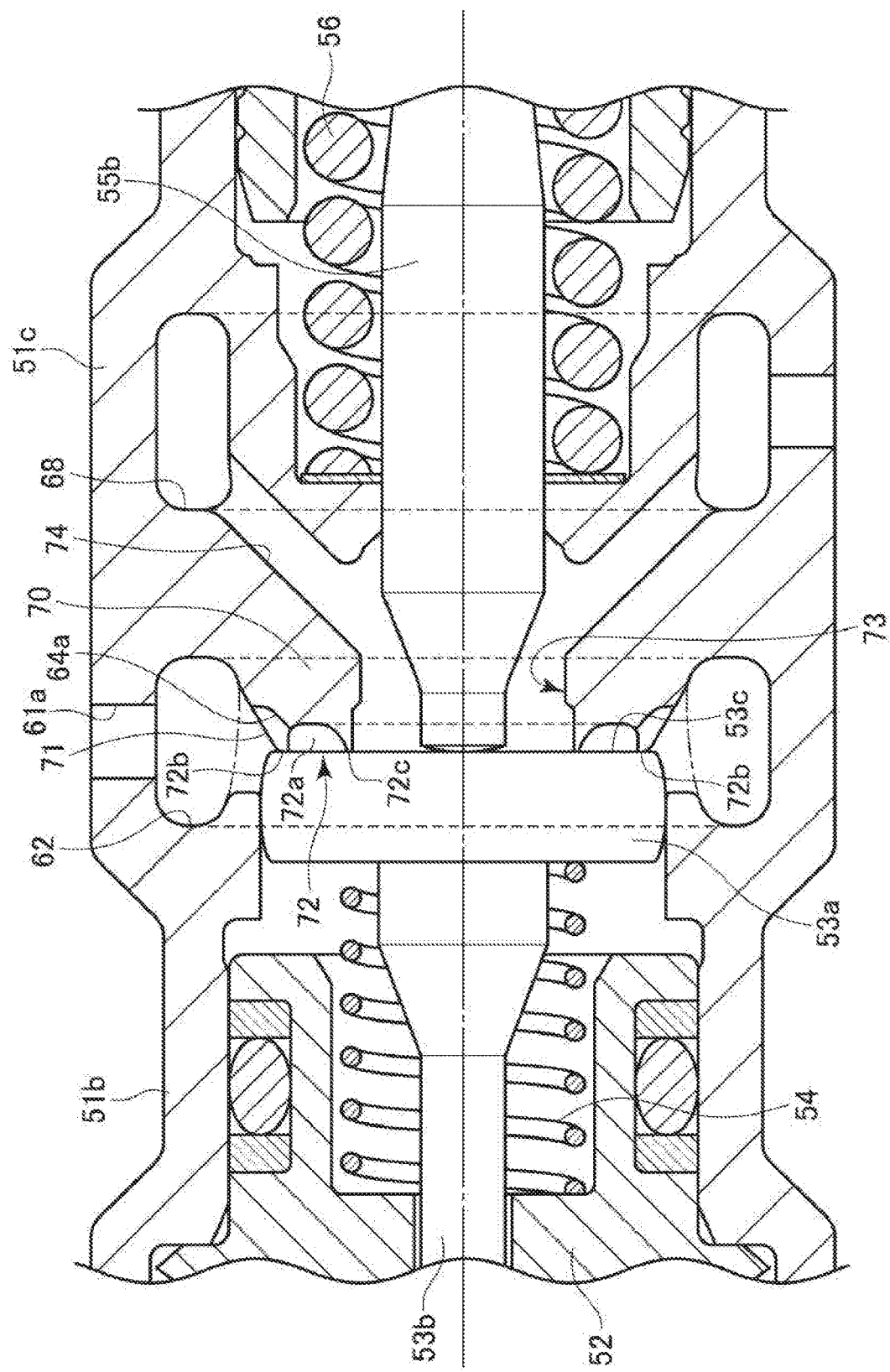
FIG. 7 is an enlarged sectional view showing a part of the fluid pressure valve of FIG. 3 in an enlarged scale.
Figure 8:
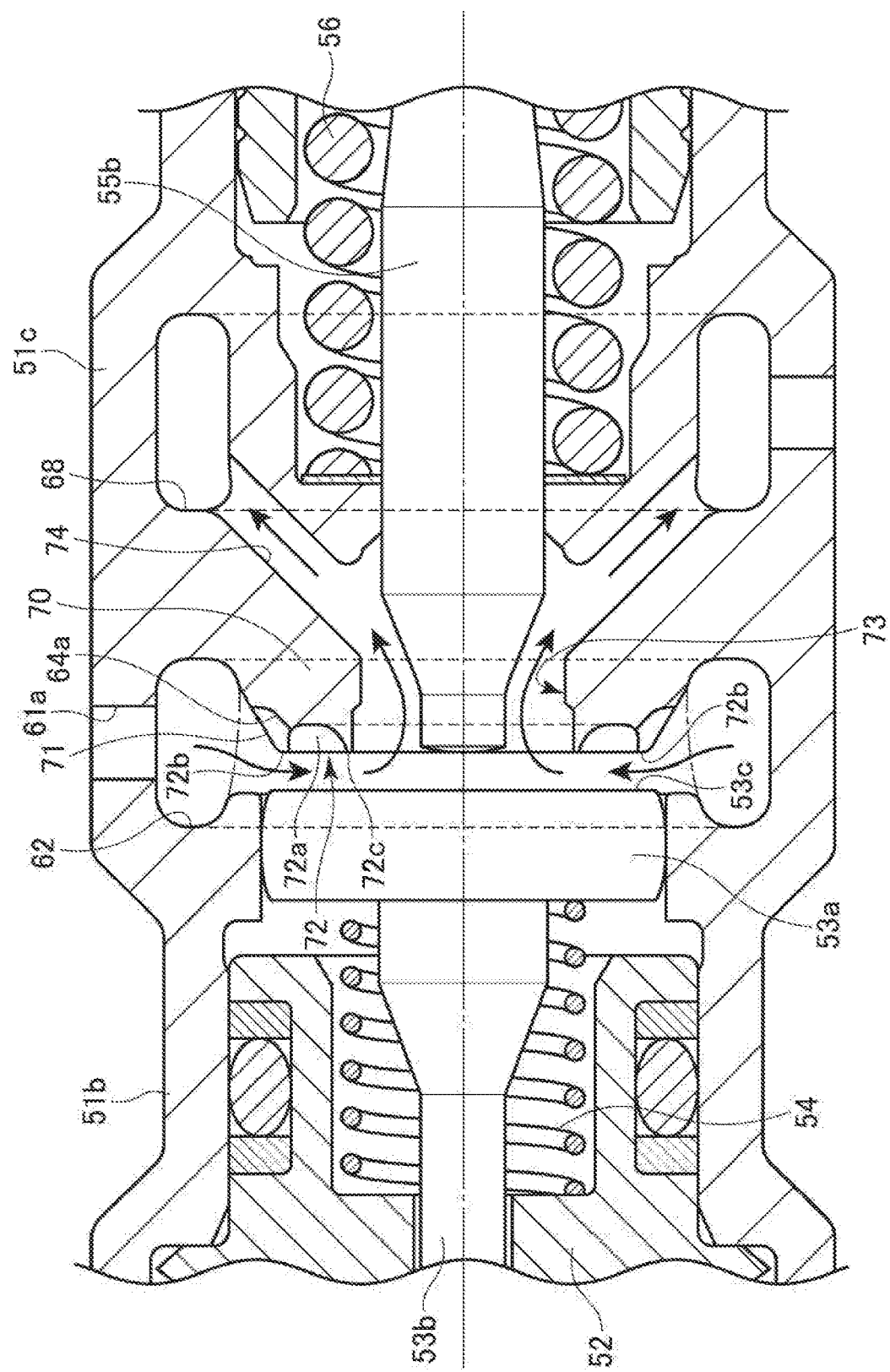
FIG. 8 is an enlarged sectional view showing a part of the fluid pressure valve of FIG. 3 in an enlarged scale.

With reference to FIGS. 7 and 8, a description will be given of a valve opening motion performed by the valve element 53 of the fluid pressure valve 5. FIGS. 7 and 8 are enlarged sectional views showing a part around the housing member 51c of the fluid pressure valve 5 in an enlarged scale. FIG. 7 shows the valve element 53 in the closed position, and FIG. 8 shows the valve element 53 in the opened position.

As shown in FIG. 7, the valve element 53 in the closed position is situated such that the end surface 53c thereof is in contact with the four parts of the outer valve seat 72b and the inner valve seat 72c.

When, for example, a pilot pressure is supplied from the fluid pressure source 2 via the third port 61c, the valve element 53 moves from the closed position shown in FIG. 7 to the valve opening position shown in FIG. 8 in the second direction W2 along the central axis C. In the opened position, the valve element 53 is separated from the outer valve seat 72b and the inner valve seat 72c. In this way, the valve element 53 moves from the closed position to the opened position. In addition, the valve element 53 also moves from the closed position to the opened position when the flight control surface 1A moves with no pilot pressure supplied and when the pressure in the closed oil passage between the valve element 53 and the second fluid pressure chamber 8b exceeds a prescribed value.

When the valve element 53 moves to the opened position, the working fluid accumulated in the first circling flow path 62 and the working fluid discharged from the second fluid pressure chamber 8b pass through the first flow path 65a, the second flow path 65b, and the third flow path 65c and flow into the second circling flow path 68, and then these working fluids flow out of the second circling flow path 68, pass the second port 61b, the flow path 11a, the control valve 4, and the flow path 12b, and flow into the reservoir 3.

In the fluid pressure valve 5 described above, the flow path 65 connecting between the first port 61a and the second port 61b is defined by the housing 51 formed integrally (or by the housing member 51c constituting a part of the housing 51 and formed integrally), and therefore, there is no need of providing a member (e.g., the valve seat support used conventionally) separate from the housing 51 to define the flow path 65. In addition, since the flow path 65 connecting between the first port 61a and the second port 61b is defined by the housing 51 formed integrally (or by the housing member 51c constituting a part of the housing 51 and formed integrally), there is no need of providing a seal member to prevent leakage of the working fluid. Thus, in the embodiment described above, the housing 51 of the fluid pressure valve 5 can have a small radial dimension.

In the housing 51 of the fluid pressure valve 5, the housing members (e.g., at least one of the housing member 51a, the housing member 51b, and the housing member 51d) other than the housing member 51c including the flow path connecting the first port 61a and the second port 61b can have an outer diameter smaller than that of the housing member 51c. Thus, portions of the housing 51 other than the housing member 51c can have a smaller radial dimension.

In the fluid pressure valve 5, the flow path 65 can be closed without use of a separate valve seat, because the valve element 53 contacts with the inner valve seat 72c formed in the housing 51.

In the fluid pressure valve 5, the flow path between the first port 61a and the second port 61b can be closed without use of a separate valve seat, because the valve element 53 contacts with the inner valve seat 72c formed in the housing 51.

In the fluid pressure valve 5, the first circling flow path 62 can have a smaller dimension in the radial direction of the housing 51 than in the longitudinal direction of the same. Thus, the housing 51 can have a smaller radial dimension.

In the fluid pressure valve 5, at least one of the first wall 62a, the second wall 62b, the third wall 62c, and the fourth wall 62d that define the first circling flow path 62 can be formed so as to be curved in the axial direction along the central axis C. This causes the working fluid to flow into the second flow path 65b via the curved surface when the valve is opened. Therefore, the pressure loss of the working fluid flowing from the first port 61a into the second port 61b can be reduced. As a result, the housing 51 can have a small size.

Figure 9:
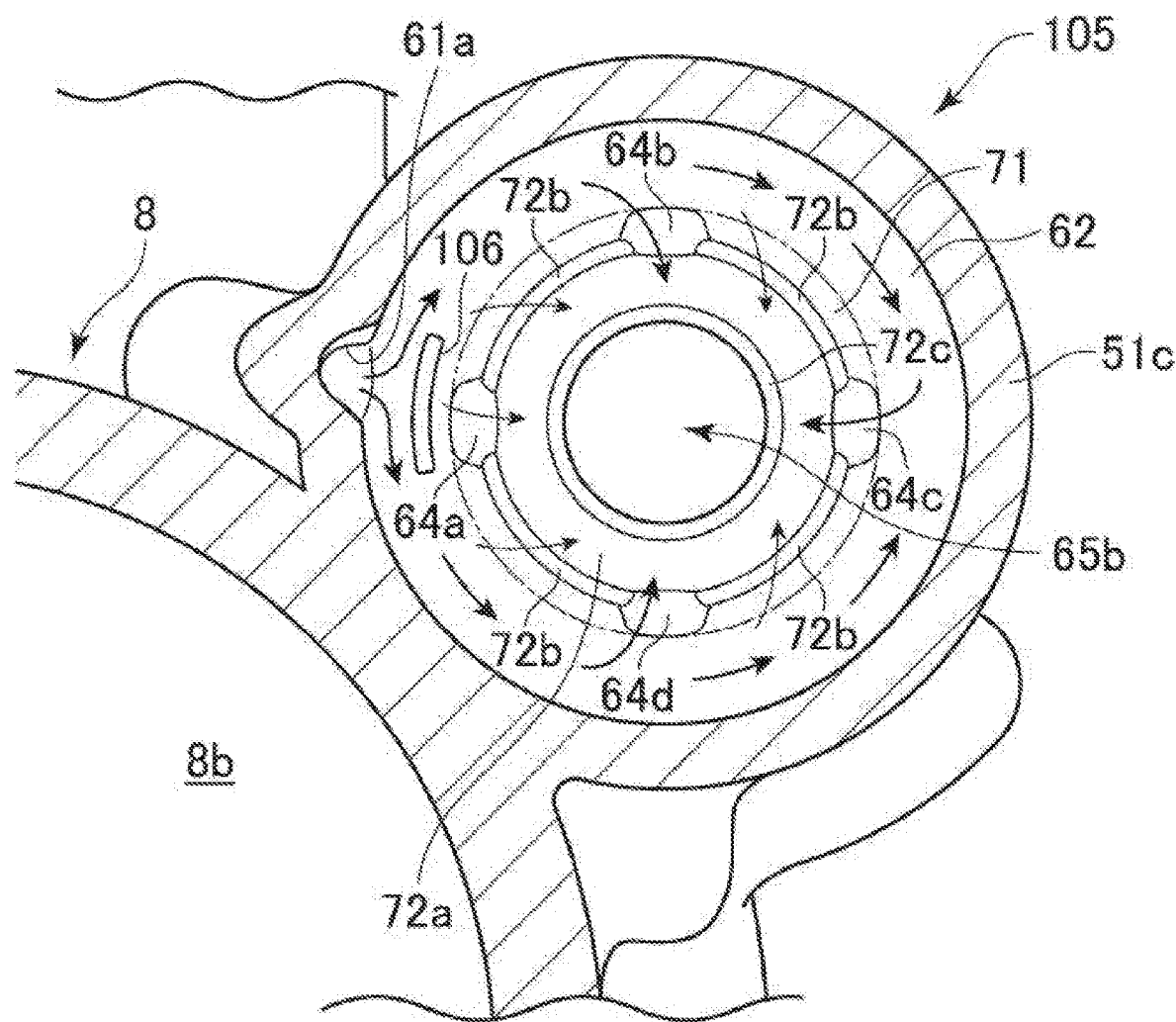
FIG. 9 is a sectional view of a fluid pressure valve according to another embodiment of the present invention.

Next, with reference to FIG. 9, a description is given of a fluid pressure valve according to another embodiment of the present invention. FIG. 9 is a sectional view of a fluid pressure valve 105 according to another embodiment of the present invention cut along a cutting line corresponding to the A-A line. The fluid pressure valve 105 is different from the fluid pressure valve 5 in that the first circling flow path 62 is provided with a projection for directing the flow of the working fluid.

In the fluid pressure valve 105 as shown, the first circling flow path 62 is provided with a projection 106. In the embodiment shown, the projection 106 projects from the fourth wall 62d defining the first circling flow path 62 in the second direction W2 along the central axis C. The projection 106 is formed integrally with the housing 51, constituting a part thereof. The projection 106 is disposed, for example, in a virtual line connecting between the first port 61a and the central axis C (or the second flow path 65b).

The working fluid flowing from the first port 61a into the first circling flow path 62 flows around or over the projection 106 and is directed toward the second flow path 65b. Thus, the flow of the working fluid from the first port 61a toward the second flow path 65b can be more uniformed in the circumferential direction around the central axis C. More specifically, the flow running straight from the first port 61a toward the second flow path 65b is checked by the projection 106, and the flow running from the direction where the projection 106 is absent around the central axis C toward the second flow path 65b is facilitated. The flow of the working fluid from the first port 61a toward the second fluid path 65b is thus uniformed, thereby to prevent the valve element 53 and the rod body 55b from being tilted with respect to the central axis C due to the fluid pressure of the working fluid.

The number, shape, and arrangement of the projections 106 formed in the fluid pressure valve 105 are not limited to those in the illustrated embodiment. For example, it is possible to provide two or more projections 106. The projection 106 may also be formed in various positions other than the virtual line connecting between the first port 61a and the central axis C. The number, shape, and arrangement of the projections 106 may be modified suitably for the purpose of optimizing the flow of the working fluid or other purposes.

Figure 10:
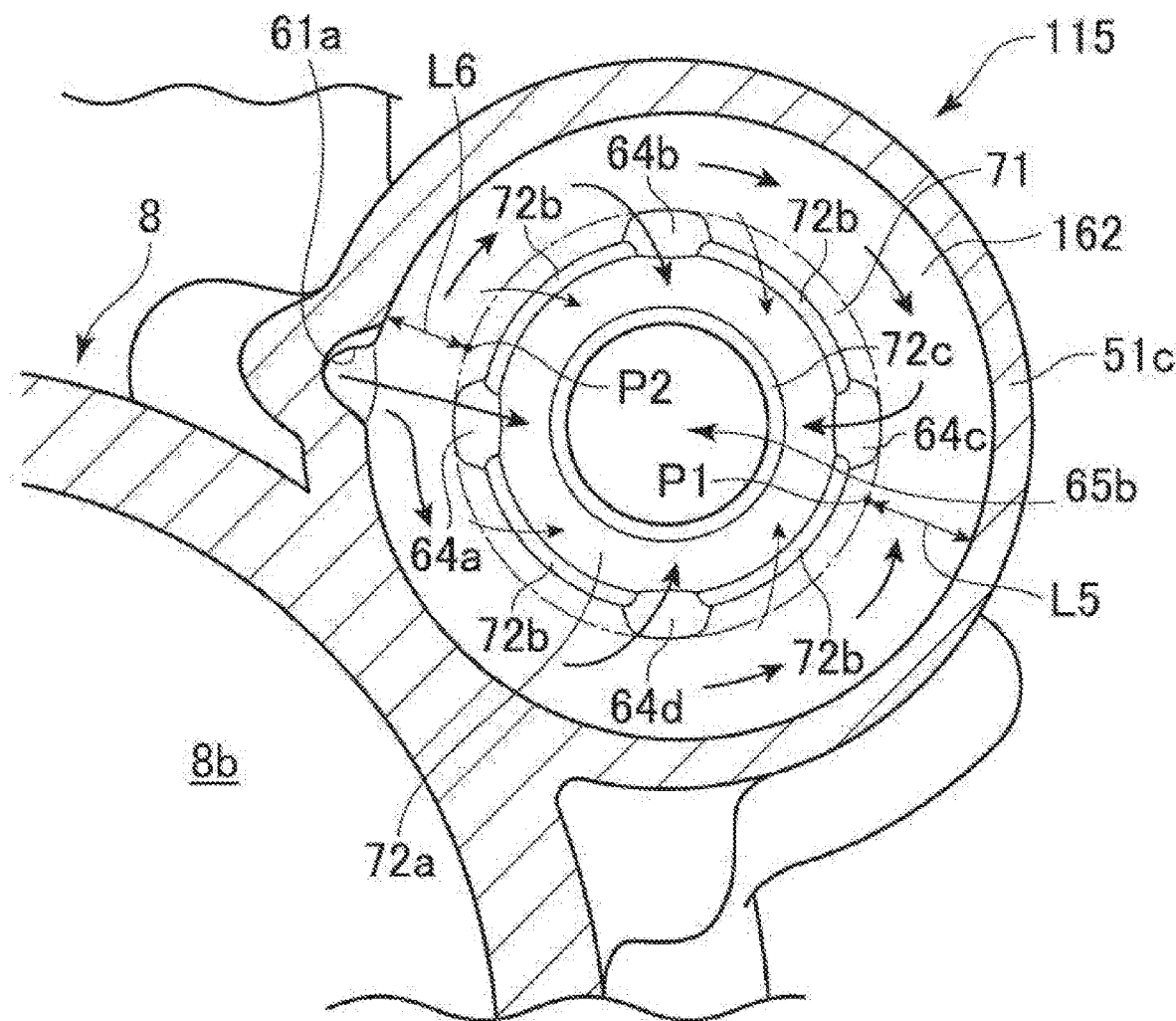
FIG. 10 is a sectional view of a fluid pressure valve according to still another embodiment of the present invention.

Next, with reference to FIG. 10, a description is given of a fluid pressure valve according to still another embodiment of the present invention. FIG. 10 is a sectional view of a fluid pressure valve 115 according to another embodiment of the present invention cut along a cutting line corresponding to the A-A line. The fluid pressure valve 115 has a first circling flow path 162 in place of the first circling flow path 62.

As shown, the first circling flow path 162 is formed such that the radial dimension L5 thereof at a first position P1 distal from the first port 61a is larger than the radial dimension L6 thereof at a second position P2 proximal to the first port 61a. As a result, the sectional area of the first circling flow path 162 at the first position P1 is larger than that at the second position P2.

In the embodiment shown in FIG. 10, the housing member 51c has a smaller thickness at the first position P1 than at the second position P2. In this way, the housing member 51c has different thicknesses at the first position P1 and the second position P2 that is distant from the first position P1 in the circumferential direction, such that the sectional area of the flow path in the housing member 51c can be varied in the circumferential direction. It is also possible to form the first circling flow path 162 in a different manner.

Figure 11:
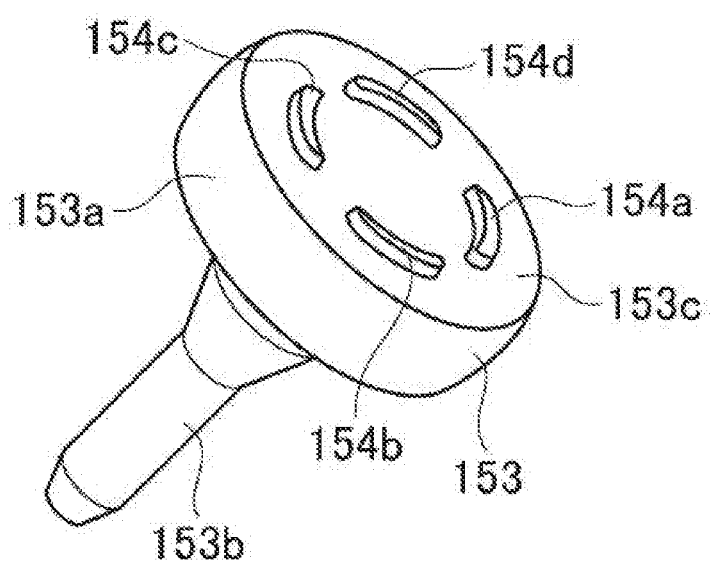
FIG. 11 is a schematic perspective view of a valve element included in a fluid pressure valve according to yet another embodiment of the present invention.

According to the above embodiment, the working fluid flowing from the first port 61a into the first circling flow path 162 can be easily guided in the first circling flow path 162 to the first position P1 distal from the first port 61a. Thus, the flow of the working fluid from the first port 61a toward the second flow path 65b can be more uniformed in the circumferential direction around the central axis C. As a result, the valve element 53 and the rod body 55b can be prevented from being tilted with respect to the central axis C due to the fluid pressure of the working fluid Next, with reference to FIG. 11, a description is given of a valve element used in a fluid pressure valve according to yet another embodiment of the present invention. FIG. 11 is a schematic perspective view of a valve element 153 included in a fluid pressure valve according to yet another embodiment of the present invention. The valve element 153 may replace the valve 53 in the fluid pressure valve 5 and other fluid pressure valves to which the present invention is applied.

As shown, the valve element 153 includes a valve element head 153a and a valve element base 153b extending from the valve element head 153a. When the valve element 153 is installed in the fluid pressure valve 5, a distal end of the valve element base 153b is received in the first recess 52c and the second recess 52d of the cap 52.

The end surface 153c of the valve element 153 has four projections 154a to 154d formed thereon. The projections 154a to 154d project from the end surface 153c of the valve element 153. When the valve element 153 is installed in the fluid pressure valve 5, the projections 154a to 154d are disposed in the first circling flow path 62. The valve element 153 may be installed in the fluid pressure valve 5 such that one of the projections 154a to 154d is disposed in the virtual line connecting between the first port 61a and the central axis C (or the second flow path 65b).

The projections 154a to 154d, disposed in the first circling flow path 62, direct the flow of the working fluid flowing in the first circling flow path 62. For example, one of the projections 154a to 154d may be disposed in the virtual line connecting between the first port 61a and the central axis C (or the second flow path 65b) so as to check the flow running straight from the first port 61a toward the second flow path 65b. As a result, the rod body 55b can be prevented from being tilted with respect to the central axis C due to the fluid pressure of the working fluid.

The number, shape, and arrangement of the projections 154a to 154d formed on the valve element 153 are not limited to those in the illustrated embodiment. For example, the valve element 153 may have three or less projections formed thereon. The number, shape, and arrangement of the projections formed on the end surface 153c of the valve element 153 may be modified suitably for the purpose of optimizing the flow of the working fluid or other purposes.

The dimensions, materials, and arrangements of the constituents described in this specification are not limited to those explicitly described for the embodiments, and the constituents can be modified to have any dimensions, materials, and arrangements within the scope of the present invention. The elements other than those explicitly described herein may be added to the described embodiments, and some of the elements described for the embodiments may be omitted.

The fluid pressure servo mechanism 1 shown in FIG. 1 is an example of a fluid pressure servo mechanism to which the present invention is applicable. The fluid pressure servo mechanism 1 can be modified desirably in accordance with its applications based on technical knowledge of those skilled in the art. For example, the fluid pressure servo mechanism 1 may include a fluid pressure device not explicitly described in this specification or the appended drawings. The processing and control performed by the controller 10 may alternatively be performed by a plurality of controllers in a distributed manner.

The specific shapes, arrangements, functions, and materials of the components of the fluid pressure valves 5, 105, 115 explicitly described in this specification or the appended drawings are merely for illustration. The shapes, arrangements, functions, and materials of the components of the fluid pressure valves 5, 105, 115 can be modified desirably within the purport of the present invention.

What is claimed is:

1. A fluid pressure servo mechanism comprising:
    a fluid pressure actuator including a cylinder having a pair of fluid pressure chambers defined therein; and
    a fluid pressure valve disposed on an external outer surface of the cylinder of the fluid pressure actuator, the fluid pressure valve being in communication with one of the pair of fluid pressure chambers via a connecting flow path,
    wherein the connecting flow path includes:
        a fluid pressure valve connector portion at a first end thereof,
        a fluid pressure actuator connector portion at a second end thereof, the second end being opposite to the first end, and
        a connector flow path disposed between and connecting the fluid pressure valve connector portion at the first end of the connecting flow path and the fluid pressure actuator connector portion at the second end of the connecting flow path,
        the connector flow path extending along a substantially length of the connecting flow path, and
    wherein the connector flow path of the connecting flow path is disposed on the external outer surface of the cylinder of the fluid pressure actuator such that the connector flow path of the connecting flow path extends along the external outer surface of the cylinder of the fluid pressure actuator from the fluid pressure actuator to the fluid pressure valve.

2. The fluid pressure servo mechanism of claim 1, wherein the connector flow path of the connecting flow path is disposed entirely outside of the cylinder.

* * * * *